(12) United States Patent
Boss et al.

(10) Patent No.: US 8,180,660 B2
(45) Date of Patent: May 15, 2012

(54) NON-DEPLETING CHIPS FOR OBTAINING DESIRED SERVICE LEVEL CHARACTERISTICS

(75) Inventors: Gregory J. Boss, American Fork, UT (US); Christopher J. Dawson, Arlington, VA (US); Rick A. Hamilton, II, Charlottesville, VA (US); Timothy M. Waters, Hiram, GA (US)

(73) Assignee: International Business Machines Corporation, Armonk, NY (US)

( * ) Notice: Subject to any disclaimer, the term of this patent is extended or adjusted under 35 U.S.C. 154(b) by 989 days.

(21) Appl. No.: 11/756,374

(22) Filed: May 31, 2007

(65) Prior Publication Data

US 2008/0300947 A1    Dec. 4, 2008

(51) Int. Cl.
*G06Q 10/00* (2012.01)
(52) U.S. Cl. .................................... 705/7.12; 705/7.11
(58) Field of Classification Search .................. 705/7.11, 705/7.12
See application file for complete search history.

(56) References Cited

U.S. PATENT DOCUMENTS

| | | | |
|---|---|---|---|
| 5,371,780 A | 12/1994 | Amitay | |
| 6,006,194 A * | 12/1999 | Merel | 705/7.26 |
| 6,236,981 B1 | 5/2001 | Hill | |
| 6,438,539 B1 | 8/2002 | Korolev et al. | |
| 6,550,881 B1 | 4/2003 | Phillips | |
| 6,553,568 B1 | 4/2003 | Fijolek et al. | |
| 6,678,700 B1 | 1/2004 | Moore et al. | |
| 6,732,140 B1 | 5/2004 | McCue | |
| 6,754,739 B1 | 6/2004 | Kessler et al. | |
| 6,842,899 B2 | 1/2005 | Moody et al. | |
| 6,859,927 B2 | 2/2005 | Moody et al. | |
| 6,925,493 B1 | 8/2005 | Barkan et al. | |
| 6,947,987 B2 | 9/2005 | Boland | |
| 6,968,323 B1 | 11/2005 | Bansal et al. | |
| 6,987,578 B2 | 1/2006 | Alexander | |
| 7,062,559 B2 | 6/2006 | Yoshimura et al. | |
| 7,099,681 B2 | 8/2006 | O'Neill | |
| 7,103,580 B1 | 9/2006 | Batachia et al. | |
| 7,103,847 B2 | 9/2006 | Alford, Jr. et al. | |
| 7,177,838 B1 | 2/2007 | Ling | |
| 7,222,345 B2 | 5/2007 | Gray et al. | |
| 7,249,099 B2 | 7/2007 | Ling | |
| 7,266,523 B2 | 9/2007 | Depura et al. | |
| 7,401,035 B1 | 7/2008 | Young | |
| 7,899,696 B2 | 3/2011 | Boss et al. | |

(Continued)

OTHER PUBLICATIONS

Creating Socially Conscious Agents_Decision_Making in the Context of Group Commitments Alyssa Glass TR-06-99 Apr. 1999.*

(Continued)

*Primary Examiner* — William Rankins
(74) *Attorney, Agent, or Firm* — William Schiesser; Hoffman Warnick LLC (57) ABSTRACT

This application describes non-depleting chips and their use in a Resource Management Framework. In this methodology, chips do not deplete when spent, but rather represent a weighting that each party/business unit (BU) has to accomplish its IT processing needs over time. In this model, BUs are assigned a certain buying power that may be thought of as akin to chips on a roulette wheel. Such a model may be used with either scheduled auctions (i.e., discrete events), or they may be used via a spot market where no scheduled auctions are conducted (i.e., fluid events). In this concept, the chips are never depleted.

23 Claims, 7 Drawing Sheets

U.S. PATENT DOCUMENTS

| | | | |
|---|---|---|---|
| 7,899,697 | B2 | 3/2011 | Boss et al. |
| 2001/0034688 | A1 | 10/2001 | Annunziata |
| 2001/0042032 | A1 | 11/2001 | Crawshaw et al. |
| 2002/0065766 | A1 | 5/2002 | Brown et al. |
| 2002/0073014 | A1 | 6/2002 | Gilbert |
| 2002/0091624 | A1 | 7/2002 | Glodjo et al. |
| 2002/0128949 | A1 | 9/2002 | Wiesehuegel et al. |
| 2002/0135796 | A1 | 9/2002 | Alexander |
| 2002/0147675 | A1 | 10/2002 | Das et al. |
| 2002/0174052 | A1 | 11/2002 | Guler et al. |
| 2003/0018562 | A1 | 1/2003 | Guler et al. |
| 2003/0023540 | A2 | 1/2003 | Johnson et al. |
| 2003/0035429 | A1 | 2/2003 | Mitra et al. |
| 2003/0041007 | A1 | 2/2003 | Grey et al. |
| 2003/0041011 | A1 | 2/2003 | Grey et al. |
| 2003/0041014 | A1 | 2/2003 | Grey et al. |
| 2003/0055729 | A1 | 3/2003 | Bezos et al. |
| 2003/0069828 | A1 | 4/2003 | Blazey et al. |
| 2003/0071861 | A1 | 4/2003 | Phillips |
| 2003/0083926 | A1 | 5/2003 | Semret et al. |
| 2003/0101124 | A1 | 5/2003 | Semret et al. |
| 2003/0167329 | A1 | 9/2003 | Kurakake et al. |
| 2003/0216971 | A1 | 11/2003 | Sick et al. |
| 2004/0010592 | A1 | 1/2004 | Carver et al. |
| 2004/0024687 | A1 | 2/2004 | Delenda |
| 2004/0059646 | A1 | 3/2004 | Harrington et al. |
| 2004/0083160 | A1 | 4/2004 | Byde et al. |
| 2004/0111308 | A1 | 6/2004 | Yakov |
| 2004/0133506 | A1 | 7/2004 | Glodjo et al. |
| 2004/0133609 | A1 | 7/2004 | Moore et al. |
| 2004/0230317 | A1 | 11/2004 | Kumar et al. |
| 2005/0055306 | A1 | 3/2005 | Miller et al. |
| 2005/0071182 | A1 | 3/2005 | Aikens et al. |
| 2005/0138621 | A1* | 6/2005 | Clark et al. ............... 718/100 |
| 2005/0141554 | A1 | 6/2005 | Hammarlund et al. |
| 2005/0144115 | A1 | 6/2005 | Brett |
| 2005/0192865 | A1 | 9/2005 | Boutilier et al. |
| 2005/0207340 | A1 | 9/2005 | O'Neill |
| 2005/0256946 | A1 | 11/2005 | Childress et al. |
| 2005/0278240 | A1 | 12/2005 | Delenda |
| 2005/0289042 | A1* | 12/2005 | Friesen ..................... 705/37 |
| 2005/0289043 | A1 | 12/2005 | Maudlin |
| 2006/0047550 | A1* | 3/2006 | Dineen et al. ............... 705/8 |
| 2006/0069621 | A1 | 3/2006 | Chang et al. |
| 2006/0080210 | A1 | 4/2006 | Mourad et al. |
| 2006/0080224 | A1 | 4/2006 | Schuelke |
| 2006/0080438 | A1 | 4/2006 | Storrie |
| 2006/0149652 | A1 | 7/2006 | Fellenstein et al. |
| 2006/0167703 | A1 | 7/2006 | Yakov |
| 2006/0195386 | A1 | 8/2006 | Glodjo et al. |
| 2007/0118419 | A1 | 5/2007 | Maga et al. |
| 2007/0136176 | A1 | 6/2007 | Niedermeier |
| 2007/0276688 | A1 | 11/2007 | Sun et al. |
| 2008/0080552 | A1 | 4/2008 | Gates et al. |

OTHER PUBLICATIONS

Dynamic Resource Allocation for a Sensor Network Manuscript #335 Paolo Gaudiano, Iavor Trifonov, Martin C. Martin, Eric Bonabeau—Date Unknown.*
U.S. Appl. No. 11/756,360, Office Action dated Feb. 8, 2010.
U.S. Appl. No. 11/756,325, Office Action dated Feb. 2, 2010.
U.S. Appl. No. 11/755,985, Office Action, dated Jan. 29, 2010.
U.S. Appl. No. 11/756,426, filed May 31, 2007, Final Office Action dated Mar. 24, 2010, 20 pages.
U.S. Appl. No. 11/756,416, filed May 31, 2007, Final Office Action dated Mar. 24, 2010, 14 pages.
U.S. Appl. No. 11/756,400, filed May 31, 2007, Final Office Action dated Mar. 24, 2010, 20 pages.
U.S. Appl. No. 11/756,386, filed May 31, 2007, Final Office Action dated Mar. 24, 2010, 14 pages.
U.S. Appl. No. 11/756,426, Advisory Action dated Jun. 8, 2010, 3 pages.
U.S. Appl. No. 11/756,400, Advisory Action dated Jun. 8, 2010, 3 pages.
U.S. Appl. No. 11/756,360, Notice of Allowance and Fees Due dated May 19, 2010, 6 pages.
Boss et al, U.S. Appl. No. 11/756,325, Office Action Communication, Apr. 27, 2009, 10 pages.
Boss et al, U.S. Appl. No. 11/756,360, Office Action Communication, Apr. 24, 2009, 12 pages.
Boss et al, U.S. Appl. No. 11/755,985, Office Action Communication, Apr. 1, 2009, 23 pages.
Duermeyer, Karin, "Methodology: From Component Business Model to Service Oriented Architecture", IBM Business Consulting Services, Nuernberger Kreis—Softwaretag: 7, May 2004, 41 pages.
U.S. Appl. No. 11/756,325, filed May 31, 2007, Notice of Allowance and Fees due dated Jul. 14, 2010, 10 pages.
U.S. Appl. No. 11/755,985, filed May 31, 2007, Final Office Action dated Jul. 1, 2010, 23 pages.
U.S. Appl. No. 11/756,416, filed May 31, 2007, Notice of Allowance and Fees due dated Jun. 30, 2010, 4 pages.
U.S. Appl. No. 11/756,313, filed May 31, 2007, Office Action dated Jun. 29, 2010, 31 pages.
U.S. Appl. No. 11/756,386, filed May 31, 2007, Notice of Allowance and Fees due dated Jun. 29, 2010, 4 pages.
U.S. Appl. No. 11/756,400, filed May 31, 2007, Office Action dated Jun. 24, 2010, 12 pages.
U.S. Appl. No. 11/756,426, filed May 31, 2007, Office Action dated Jun. 24, 2010, 10 pages.
Ozsomer et al., "A Resource-Based Model of Market Learning in the Subsidiary: The Capabilities of Exploration and Exploitation", Journal of International Marketing, vol. 11, No. 3, 2003.
Staudenmayer, Nancy, "Interdependency: Conceptual, Empirical, and Practical Issues", The International Center for Research on the Management of Technology, Jun. 1997.
Boss, U.S. Appl. No. 11/756,386, Office Action Communication, Oct. 8, 2009, 13 pages.
Boss, U.S. Appl. No. 11/756,400, Office Action Communication, Oct. 8, 2009, 18 pages.
Boss, U.S. Appl. No. 11/756,360, Office Action Communication, Oct. 14, 2009, 13 pages.
Boss, U.S. Appl. No. 11/756,325, Office Action Communication, Oct. 13, 2009, 12 pages.
Boss, U.S. Appl. No. 11/756,416, Office Action Communication, Oct. 14, 2009, 16 pages.
Boss, U.S. Appl. No. 11/755,985, Office Action Communication, Nov. 2, 2009, 16 pages.
Boss, U.S. Appl. No. 11/756,426, Office Action Communication, Oct. 29, 2009, 20 pages.
Carter, Candice D., U.S. Appl. No. 11/756,426, filed May 31, 2007, Notice of Allowance and Fees Due dated Oct. 20, 2010, 27 pages.
Gregg, Mary M., U.S. Appl. No. 11/755,985, filed May 31, 2007, Office Action dated Oct. 2010, 27 pages.
Carter, Candice D., U.S. Appl. No. 11/756,400, filed May 31, 2007, Notice of Allowance and Fees Due, 26 pages.
Nguyen, Nga, B., U.S. Appl. No. 11/756,406, filed May 31, 2007, Office Action dated Aug. 17, 2010, 32 pages.
Araque Jr., Gerardo, U.S. Appl. No. 11/756,313, filed May 31, 2007, Final Office Action dated Dec. 10, 2010.
Lan, Tzu-Hsiang, U.S. Appl. No. 11/755,971, filed May 31, 2007, Office Action dated Nov. 26, 2010.
Wai, U.S. Appl. No. 11/756,367, Office Action Communication, Jun. 13, 2011, 38 pages.
Nisan, "Bidding and Allocation in Combinatorial Auctions", Proceedings of the 2nd ACM Conference on Electronic Commerce, 2000, 12 pages.
Nguyen, U.S. Appl. No. 11/756,406, Office Action Communication, Feb. 22, 2011, 15 pages.
Garg, U.S. Appl. No. 11/756,442, Office Action Communication, Feb. 10, 2011, 35 pages.
Araque, Jr., U.S. Appl. No. 11/756,313, Office Action Communication, Mar. 25, 2011, 33 pages.
Tushar Mahapatra & Sanjay Mishra, Oracle Parellel Processing, 2000, O'Reilly & Associates, Inc., First Edition, Entire Book, specifically pp. 1-43, 200-212.
Gregg, U.S. Appl. No. 11/755,985, Office Action Communication, May 5, 2011, 35 pages.
The University of Melbourne: Annual Budget 2004, 84 pages: www.unimelb.edu.au/publications/docs/budget2004.pdf.

Carter, U.S. Appl. No. 11/756,416, Notice of Allowance & Fees Due, May 17, 2011, 19 pages.
Lan, U.S. Appl. No. 11/755,971, Office Action Communication, May 19, 2011, 16 pages.
Carter, U.S. Appl. No. 11/756,360, Notice of Allowance & Fees Due, May 20, 2011, 19 pages.
Carter, U.S. Appl. No. 11/756,386, Notice of Allowance & Fees Due, May 23, 2011, 19 pages.
Wai, U.S. Appl. No. 11/756,357, Office Action Communication, May 26, 2011, 32 pages.
Wai, U.S. Appl. No. 11/756,357, Office Action Communication, Nov. 10, 2011, 17 pages.
Nguyen, U.S. Appl. No. 11/456,406, Notice of Allowance and Fees Due, 19 pages.
Gregg, U.S. Appl. No. 11/755,985, Office Action Communication, Dec. 2, 2011, 75 pages.
Araque, Jr., U.S. Appl. No. 11/756,313, Office Action Communication, Aug. 29, 2011, 37 pages.
Garg, U.S. Appl. No. 11/756,442, Notice of Allowance & Fees Due, Sep. 12, 2011, 16 pages.
Chew, U.S. Appl. No. 11/755,980, Office Action Communication, Jun. 23, 2011, 50 pages.
Garg, U.S. Appl. No. 11/756,442, Office Action Communication, Jun. 24, 2011, 8 pages.
Wai, U.S. Appl. No. 11/756,367, Office Action Communication, Dec. 9, 2011, 19 pages.
Chew, U.S. Appl. No. 11/755,980, Office Action Communication, Dec. 20, 2011, 32 pages.

* cited by examiner

NON-DEPLETING CHIPS FOR OBTAINING DESIRED SERVICE LEVEL CHARACTERISTICS

CROSS-REFERENCE TO RELATED APPLICATIONS

This application is related in some aspects to commonly owned patent application Ser. No. 11/756,367, entitled "RESOURCE MANAGEMENT FRAMEWORK", filed concurrently herewith, the entire contents of which are herein incorporated by reference.

This application is related in some aspects to commonly owned patent application Ser. No. 11/756,360, entitled "METHOD, SYSTEM, AND PROGRAM PRODUCT FOR SELECTING A BROKERING METHOD FOR OBTAINING DESIRED SERVICE LEVEL CHARACTERISTICS", filed concurrently herewith, the entire contents of which are herein incorporated by reference.

This application is related in some aspects to commonly owned patent application Ser. No. 11/756,357, entitled "DISCRETE, DEPLETING CHIPS FOR OBTAINING DESIRED SERVICE LEVEL CHARACTERISTICS", filed concurrently herewith, the entire contents of which are herein incorporated by reference.

This application is related in some aspects to commonly owned patent application Ser. No. 11/756,325, entitled "FLUID, DEPLETING CHIPS FOR OBTAINING DESIRED SERVICE LEVEL CHARACTERISTICS", filed concurrently herewith, the entire contents of which are herein incorporated by reference.

FIELD OF THE INVENTION

The present invention generally relates to the brokering of biddable resources (e.g., computational resources). Specifically, the present invention addresses a need for using non-depleting chips (fluid or discrete) for obtaining desired service level characteristics.

BACKGROUND OF THE INVENTION

Businesses are experiencing an ever-increasing trend to achieve higher utilization of computing resources. Companies that provide their own IT computing services are being driven to find ways to decrease costs by increasing utilization. Moreover, companies that provide these services are being driven to reduce overhead and become more competitive by increasing utilization of these resources. Numerous studies over the past decade have shown that typical utilization levels of computing resources within service delivery centers, raised floors, and data centers fall between 20% and 80%. This leaves a tremendous amount of white space with which to improve utilization and drive costs down.

These issues are compounded by the fact that, in many instances, multiple parties compete for common resources. Such competition can occur both on an inter-organization level as well as on an intra-organization level (e.g., between business units). To this extent, none of the existing approaches address how much resources a particular party is allowed to consume. That is, none of the existing approaches provide a way to adequately ration a party computational resources in a way that will fulfill its needs, while not preventing the needs of other parties from being met. Accordingly, there exists a need in the art to overcome the deficiencies and limitations described hereinabove.

SUMMARY OF THE INVENTION

This application describes non-depleting chips and their use in a Resource Management Framework as further described below and in the above-incorporated applications. In this methodology, chips do not deplete when spent, but rather represent a weighting that each party/business unit (BU) has to accomplish its IT processing needs over time. In this model, BUs are assigned a certain buying power that may be thought of as akin to chips on a roulette wheel. Such a model may be used with either scheduled auctions (i.e., discrete events), or they may be used via a spot market where no scheduled auctions are conducted (i.e., fluid events). In this concept, the chips are never depleted. However, under certain conditions, it may be possible that organizations (BUs) may request and/or purchase through discretionary funds additional chips to meet emergency processing needs. Whether additional emergency purchases are allowed or not, it is up to the individual BU to manage the available supply of chips to meet its processing needs. Note that, for non-depleting chips, the concept of periodic replenishment has no meaning. Rather, within a given organization, periodic reassessments may be conducted to ensure that the number of chips allocated to each BU is in fact appropriate for the mission and goals of the overall organization.

A first aspect of the present invention provides a method for allocating a supply of non-depleting chips for obtaining desired service level characteristics, comprising: assessing information technology (IT) needs of a party; allocating a supply of non-depleting chips to the party for obtaining computational resources to address the IT needs; and receiving an offer to purchase a computational resource using at least a portion of the supply of non-depleting chips.

A second aspect of the present invention provides a system for allocating a supply of non-depleting chips for obtaining desired service level characteristics, comprising: a system for assessing information technology (IT) needs of a party; a system for allocating a supply of non-depleting chips to the party for obtaining computational resources to address the IT needs; and a system for receiving an offer to purchase a computational resource using at least a portion of the supply of non-depleting chips.

A third aspect of the present invention provides a program product stored on a computer readable medium for allocating a supply of non-depleting chips for obtaining desired service level characteristics, the computer readable medium comprising program code for causing a computer system to: assess information technology (IT) needs of a party; allocate a supply of non-depleting chips to the party for obtaining computational resources to address the IT needs; and receive an offer to purchase a computational resource using at least a portion of the supply of non-depleting chips.

A fourth aspect of the present invention provides a method for deploying a system for allocating a supply of non-depleting chips for obtaining desired service level characteristics, comprising: providing a computer infrastructure being operable to: assess information technology (IT) needs of a party; allocate a supply of non-depleting chips to the party for obtaining computational resources to address the IT needs; and receive an offer to purchase a computational resource using at least a portion of the supply of non-depleting chips.

A fifth aspect of the present invention provides computer software embodied in a propagated signal for allocating a supply of non-depleting chips for obtaining desired service level characteristics, the computer software comprising instructions for causing a computer system to: assess information technology (IT) needs of a party; allocate a supply of non-depleting chips to the party for obtaining computational resources to address the IT needs; and receive an offer to purchase a computational resource using at least a portion of the supply of non-depleting chips.

A sixth aspect of the present invention provides a data processing system for allocating a supply of non-depleting chips for obtaining desired service level characteristics, comprising: a memory medium; a bus coupled to the memory medium; and a processing unit coupled to the bus, the memory medium comprising program code, which when executed by the processing unit, causes the data processing system to: assess information technology (IT) needs of a party; allocate a supply of non-depleting chips to the party for computational resources to address the IT needs; and receive an offer to purchase a computational resource using at least a portion of the supply of non-depleting chips.

For each of these aspects, the following additional features/functions can be provided: re-assessing the supply of non-depleting chips in view of the IT needs of the party can be performed; a different supply of chips can be allocated to the party based on the re-assessing; the offer being received from an agent acting on behalf of the party; the offer being received pursuant to a schedule (i.e., discrete) event such as an auction or pursuant to a non-schedule event for purchasing the computational resource.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience purposes, the Detailed Description of the Invention has the following sections:
 I. General Description
 II. Computerized Implementation
I. General Description As used herein, the following terms have the following definitions:

"Chip" means any unit (virtual or otherwise) that may be exchanged for resources such as IT resources.

"Party" means any individual, group of individuals, department, business unit, cell of a component business model, etc.

"Discrete Event" means a scheduled event such as an auction.

"Fluid Event" means any unscheduled event such as a random purchase.

"Service Level Characteristic" means any type of computer or IT requirement needed by the business, including any non-functional requirements that specify criteria that can be used to judge the operation of a system, rather than specific behaviors.

"Elemental Bidding Resource (EBR)" means any computational resource (e.g., memory, processing cycles, etc) sought by a party to accomplish objectives.

As indicated above, this application describes non-depleting chips and their use in the Resource Management Framework as further described below and in the above-incorporated applications. In this methodology, chips do not deplete when spent, but rather represent a weighting that each party/business unit (BU) has to accomplish its IT processing needs over time. In this model, BU's are assigned a certain buying power that may be thought of as akin to chips on a roulette wheel. Such a model may be used with either scheduled auctions (i.e., discrete events), or they may be used via a spot market where no scheduled auctions are conducted (i.e., fluid events). In this concept, the chips are never depleted. However, under certain conditions, it may be possible that organizations (BUs) may request and/or purchase through discretionary funds additional chips to meet emergency processing needs. Whether additional emergency purchases are allowed or not, it is up to the individual BU to manage the available supply of chips to meet its processing needs. Note that, for non-depleting chips, the concept of periodic replenishment has no meaning. Rather, within a given organization, periodic reassessments may be conducted to ensure that the number of chips allocated to each BU is in fact appropriate for the mission and goals of the overall organization. It should be understood that the term allocation is intended to encompass the situation where chips are purchased as well as given out. Chips can be purchased, for example, where multiple or inter-organization competition for SLCs is occurring.

Figure 1:
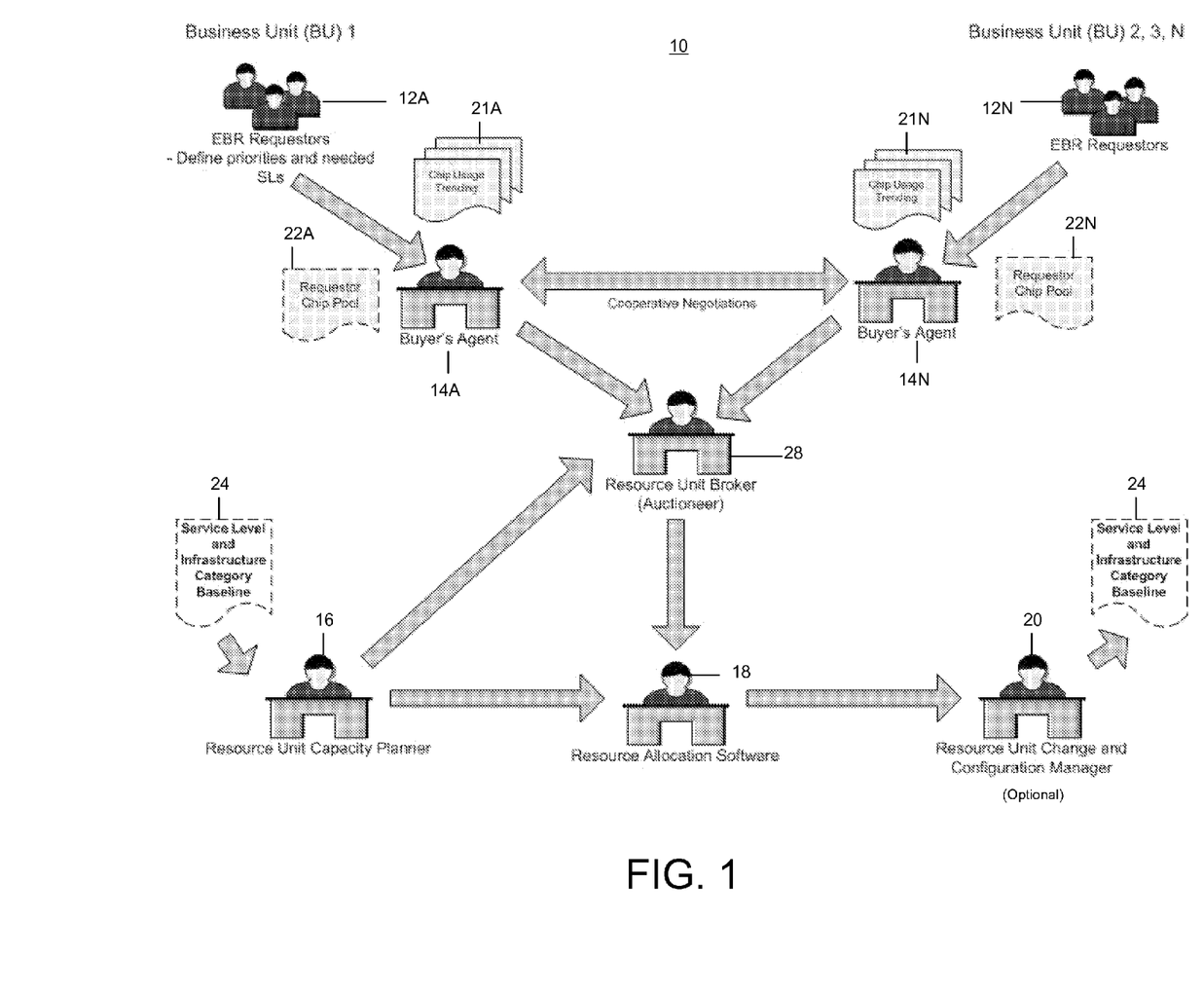
FIG. 1 shows an illustrative resource management framework according to the present invention.

Referring now to FIG. 1, a resource management framework (hereinafter framework 10) is depicted as described in Ser. No. 11/756,367, which was cross-referenced and incorporated above. As shown, framework 10 is generally comprised of business units 12A-N, buyer's agents 14A-N, resource unit capacity planner 16, resource allocation software 18, optional resource unit change and configuration manager 20, and resource unit broker 28. These components typically leverage additional assets such as chip trending usage 21A-N, requestor chip pool 22A-N, and service level and infrastructure category baseline 24.

An objective of this framework is to reach a means of maximizing utilization of IT Resources among competing consumers such as business units 12A-B by distribution of the decision making/allocation process according to relative needs of applications. Doing so eliminates the need for traditional SLAs, and allows each business unit to make dynamic "free market" decisions as to how best to obtain the service levels required from a highly-commoditized IT service provider.

To this end, business units 12A-N relay their priorities and computing needs to the buyer's agents 14A-N. Buyer's agents 14A-N then determine whether to engage in cooperative or competitive negotiations and implement a request for an EBR on the business units' 12A-N behalf. Various methods can be employed by the resource unit broker 28 to fulfill requests for resources to consumers or business units 12A-N. One method is using discrete, depleting chips (as further described in Ser. No. 11/756,357, which was cross-referenced and incorporated above), and yet another involves the use of fluid chips (as further described in Ser. No. 11/756,325, which was cross-referenced and incorporated above). Another method is described herein and involves using non-depleting chips for static or discrete events. Regardless, the buyers' agents 14A-N understand the thresholds business units 12A-N are willing to pay, their associated targets for various service level characteristics, and will programmatically employ the most advantageous bidding strategy.

The resource unit capacity planner 16 reports to resource unit brokers 28 (i.e., auctioneers) what resources are available (e.g., infrastructure components) at any given time. Resource allocation software 18 includes products such as EWLM (Enterprise Workload Manager), WebSphere XD, and Partition Load Manager (EWLM, Enterprise Workload Manager, WebSphere XD, and Partition Load Manage are trademarks of IBM Corp. in the United States and/or other countries). The goal-oriented policies within these products are updated by inputs from the resource unit broker 28 and/or resource unit capacity planner 16. Change management may be all self-contained in resource allocation software 18, or there may be cases where additional change control needs to be performed. This functionality is provided herein by optional resource unit change and configuration manager 20.

Figure 2:
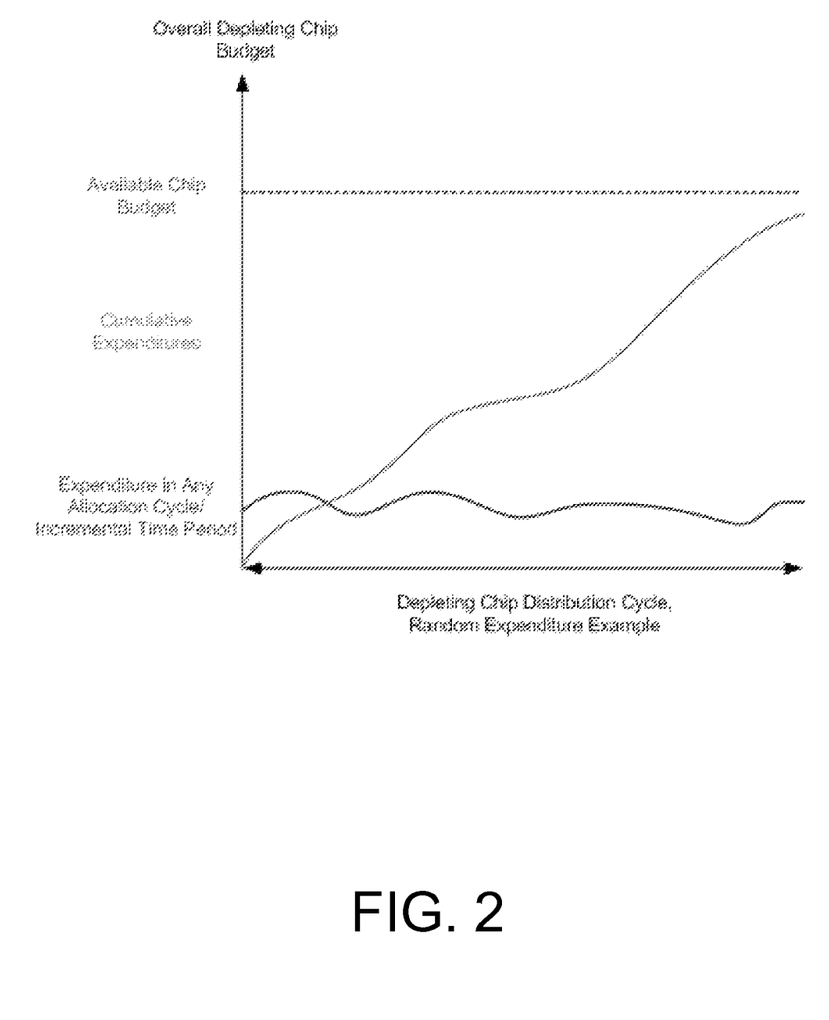
FIG. 2 shows a first illustrative chart of the use of depleting chips according to the present invention.

As indicated above, the present invention involves using non-depleting chips to allocate service level characteristics. That is, buyers' agents 14A-N will use such chips in negotiations with resource unit broker 28 to obtain allocation of resources to business units 12A-N. To aid understanding of the advantages of this non-depleting chip model, attention is turned to the distribution cycle present in those models. Referring to FIG. 2, a first illustrative chart is shown. By definition, the distribution cycle is a (relatively very long) period of time during which business units are managing a set of depleting chips, prior to the next scheduled, periodic distribution of chips. Consider the challenge inherent in managing depleting chips throughout a distribution cycle. The above chart shown in FIG. 2 illustrates a somewhat random distribution of expenditures for either the fluid or the discrete chips throughout this cycle. The goal of the buyers' agents' software will be to manage expenditures so as to achieve the desired service levels for all the business units' applications throughout a given distribution cycle. In doing so, the target of the buyers' agent's software will be to spend its last available chip at the moment the distribution cycle ends. If the chips are spent prior to the end of the distribution cycle, then computing needs for the associated business units would go un-met in the last marginal time period before the end of the cycle. If cumulative expenditures have not reached the total available chip budget at the end of the distribution cycle, then the buyers' agents' software will have fallen short in another respect, that is to say, that service levels for its associated applications will have been less than they might have been throughout the duration of the distribution cycle. Thus, the technical challenge inherent in detailed management of depleting chips becomes apparent.

Figure 3:
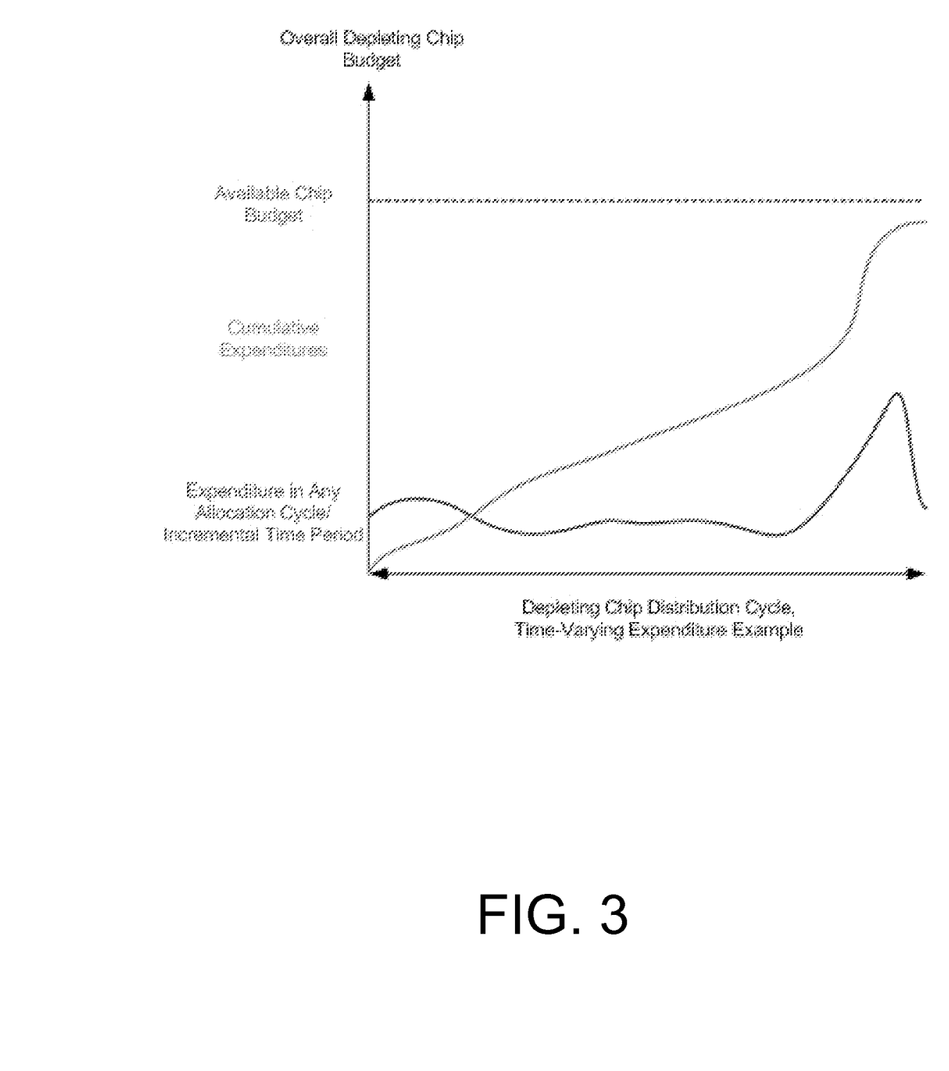
FIG. 3 shows a second illustrative chart of the use of depleting chips according to the present invention.

Compounding this case, and creating new difficulties, is the scenario depicted in FIG. 3 where chronological variations exist in a given BU's service level requirements. Practical examples of this scenario include the case where a distribution cycle equates to a month and an accounting department (the business unit) has huge processing needs at month end. Also considered may be the case where a distribution cycle equates to a single day, and the retail applications using this cycle have large nightly batch processing requirements. As can be seen, the management and expenditure scheduling tasks become more complicated when large variations are expected in workload throughout the distribution cycle. Thus, to succinctly state the advantage, use of non-depleting chips simplifies the scheduling challenges inherent in the depleting case.

Consider now that in the non-depleting case, the concept of distribution cycle does not exist. Therefore, all scheduling considerations are based upon an instantaneous decision of whether all applications in the purview of a given buyers' agents are meeting their needed service level requirements. If so, then no bid adjustments are necessary; if not, then bid adjustments are necessary. Note that this holds for both the fluid and discrete (nonscheduled auction and scheduled auction) cases. Now, rather than concerns about the nature of the distribution cycle, the decision criteria used by the buyers' agents' software is limited to examination of the running applications.

Figure 4:
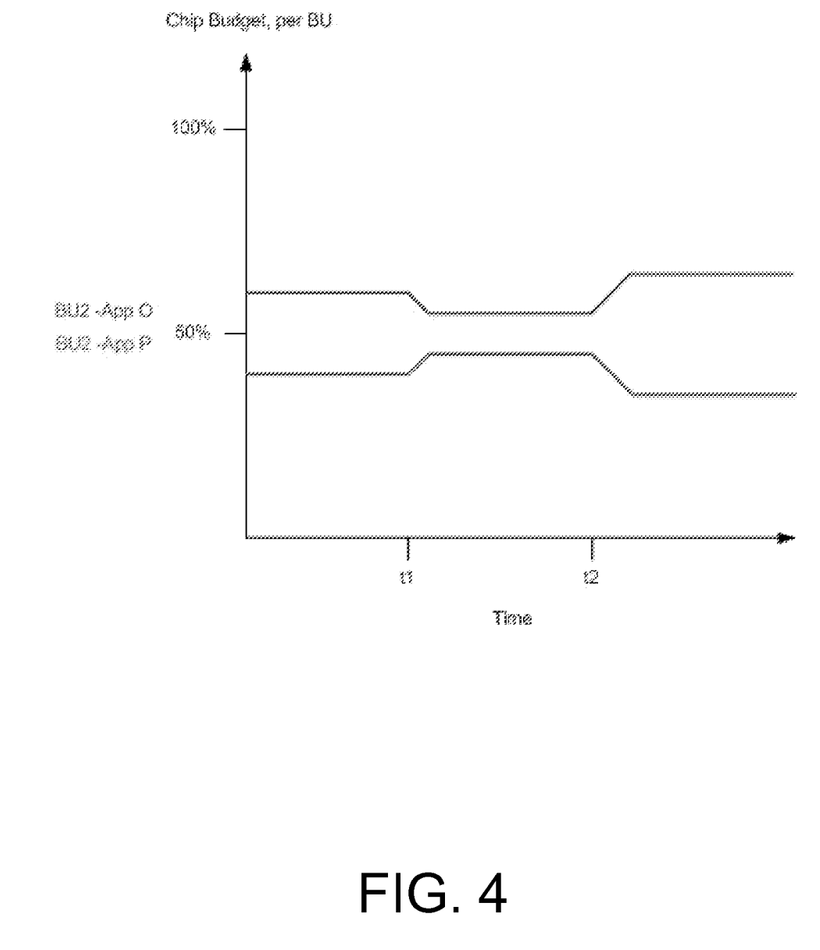
FIG. 4 shows a first illustrative chart of the use of non-depleting chips according to the present invention.

Consider a case where one business unit decides on its service level needs, in the absence of all other competing business units. In this case shown in FIG. 4, the principles of the non-depleting architecture are seen. In this simple, one business unit case, the allocations by BU2 represent 100% of the available chips at any given point in time. In this case, the bid ratio starts out with Application "O" getting 60% of the chips and Application "P" getting 40% of the chips. At time t1, the BU2 buyer's agent realizes that Application "P" may need to get better service levels, and begins adjusting the ratio of expenditures accordingly. The ratios settle into a new steady state of 55%/45% expenditures. At some later time, t2, the buyer's agent recognizes that Application "O" needs to have its performance level increased so now the ratio of chip expenditures between the applications is adjusted to a new level of 65%/35% between the two applications. Recognize that these applications may, in different implementations (depending on whether the chip totals are allocated for a BU to use on all platforms, or there are separate chip totals for each BU to use on homogeneous platforms), be running on the same hardware or on different hardware. In either case, the same principles apply.

Figure 5:
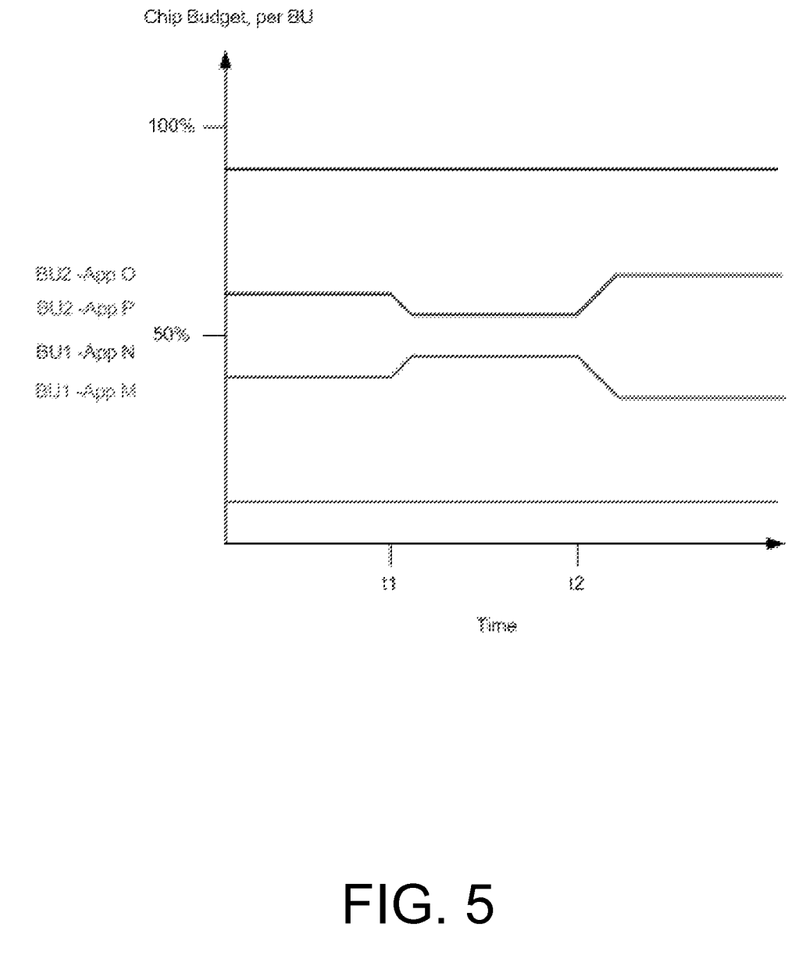
FIG. 5 shows a second illustrative chart of the use of non-depleting chips according to the present invention.

Consider now a case illustrated in FIG. 5 where two BUs exist, and that each of these BU's has two applications which it is trying to manage. Presume further, again for the sake of illustration and simplicity that each BU has the same number of chips to spend at any given time. In this example, all applications may be running on the same machine, and it is entirely possible that BU1 does not even need to react to BU2's change in prioritization. Because the overall bid amount on this same machine has not changed, then the reprioritization of jobs by BU2 does not result in any change in resources available to BU1. In this case, BU1 merely continues to maintain a constant 90%/10% ratio of expenditures between its two applications. In other cases of course, particularly when the chips are allocated to be used across all platforms, action and reallocation by one BU may likewise stimulate action by another BU.

Figure 6:
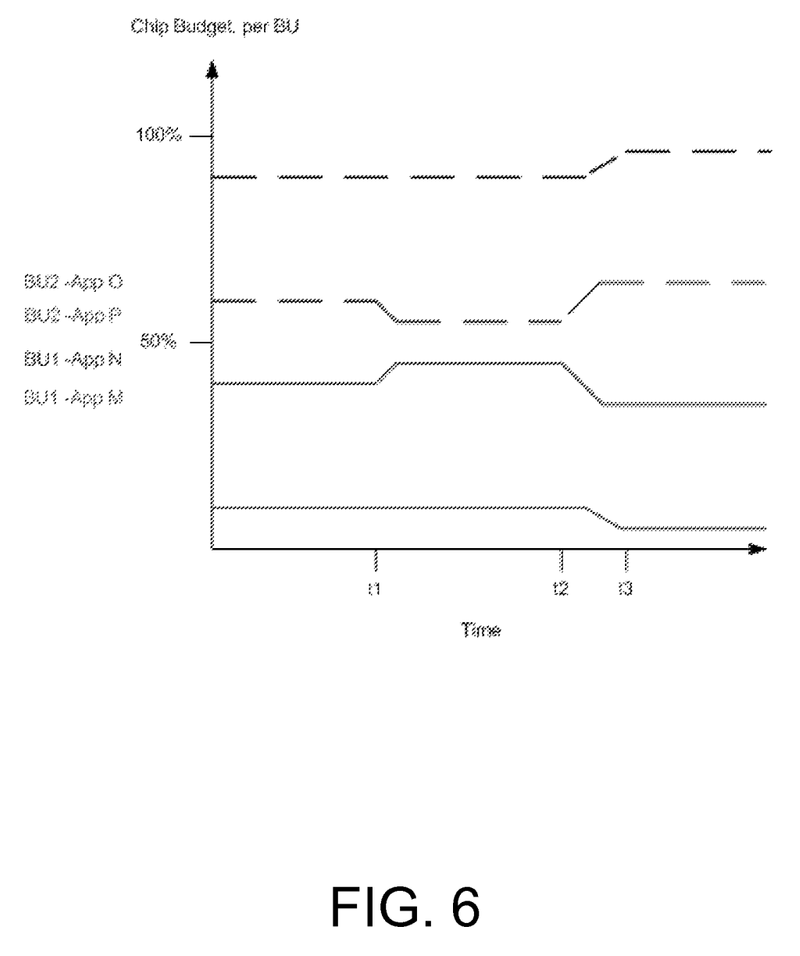
FIG. 6 shows a third illustrative chart of the use of non-depleting chips according to the present invention.

Behavior will differ according to allocation strategies, as can be illustrated in FIG. 6. Consider that Applications "O" and "N" may be running on the same platform (their coexistence noted by the dotted line), and assume that a "Ratio of Resources" allocation approach is being pursued. Presume, for the sake of argument that Application "N" is initially running in a "just sufficient" state, wherein it is just satisfying its service level requirements. At time t1, as previously noted, BU2 shifts chips away from Application "O". At this time, if all its applications are running in a sufficient state, BU1 may decide to leave all resource allocations as they currently are, and now exceed its service level requirements on application "N". (Obviously, as an aside, if its other application was running in a less-than-sufficient state, it might then decide to lower its bid ratio on application "N" and apply those chips to application "M" to increase the latter's performance.) Consider now what happens when BU2 raises its bid ratio for Application "O". Because this application was defined as being on the same platform as Application "N", and because ratio of resource allocation is being used, BU1 now finds its Application "N" falling below the desired service level requirement. In this case, in an effort to keep up with its necessary service levels, BU1 raises its own bid ratio for Application "N" in response to BU2's increase for Application "O". Accordingly, it must drop the bid ratio for Application "M" by the same amount, presuming that the importance and business case for each supports this reallocation. This response is seen at time t3.

Thus, it may be easily seen that business units can react and adapt to each others' bid strategies by shifting their own bid ratios as well. Of course, in real world examples, the number of BUs will vary, the number of applications will increase, and in all likelihood, the BUs will have different numbers of chips to spend at any given time. However, the principles illustrated here convey the basic idea behind the attractiveness of non-depleting chips, whether used in the discrete (i.e., scheduled auction) case or fluid (i.e., spot market) case.

As with other depleting chip examples, multiple allocation strategies could follow the bidding process. Any of these strategies may be implemented, according to the behavior that is deemed optimal for the adopting organization. These strategies include the following:

(1) "Winner Take All" Allocation: In this approach, the business unit with the highest bid is allocated all requested IT resources. No other business units receive IT resources (EBRs), until the winner is determined at the end of the next bid cycle or—in the fluid case example—until another BU places a larger bid for competitive resources.

(2) "Ratio of Resources (ROR)" Allocation: In this approach, the requested resources are allocated for the full allocation cycle according to a ratio of discrete chip bids between competing business units. For the fluid non-depleting chip case, of course, this RoR stays in effect until bids on a competitive EBR change.

(3) "Harvested Capacity" Allocation: This approach may be seen as near-synonymous with RoR for the fluid chip case, but for the discrete chip case, where discrete allocation cycles exist, the Harvested Capacity may be seen as a more dynamic reallocation and distribution of resources to the losing entity (ies) according to the needs of the winner and the functionality left after such an auction.

II. Computerized Implementation

Figure 7:
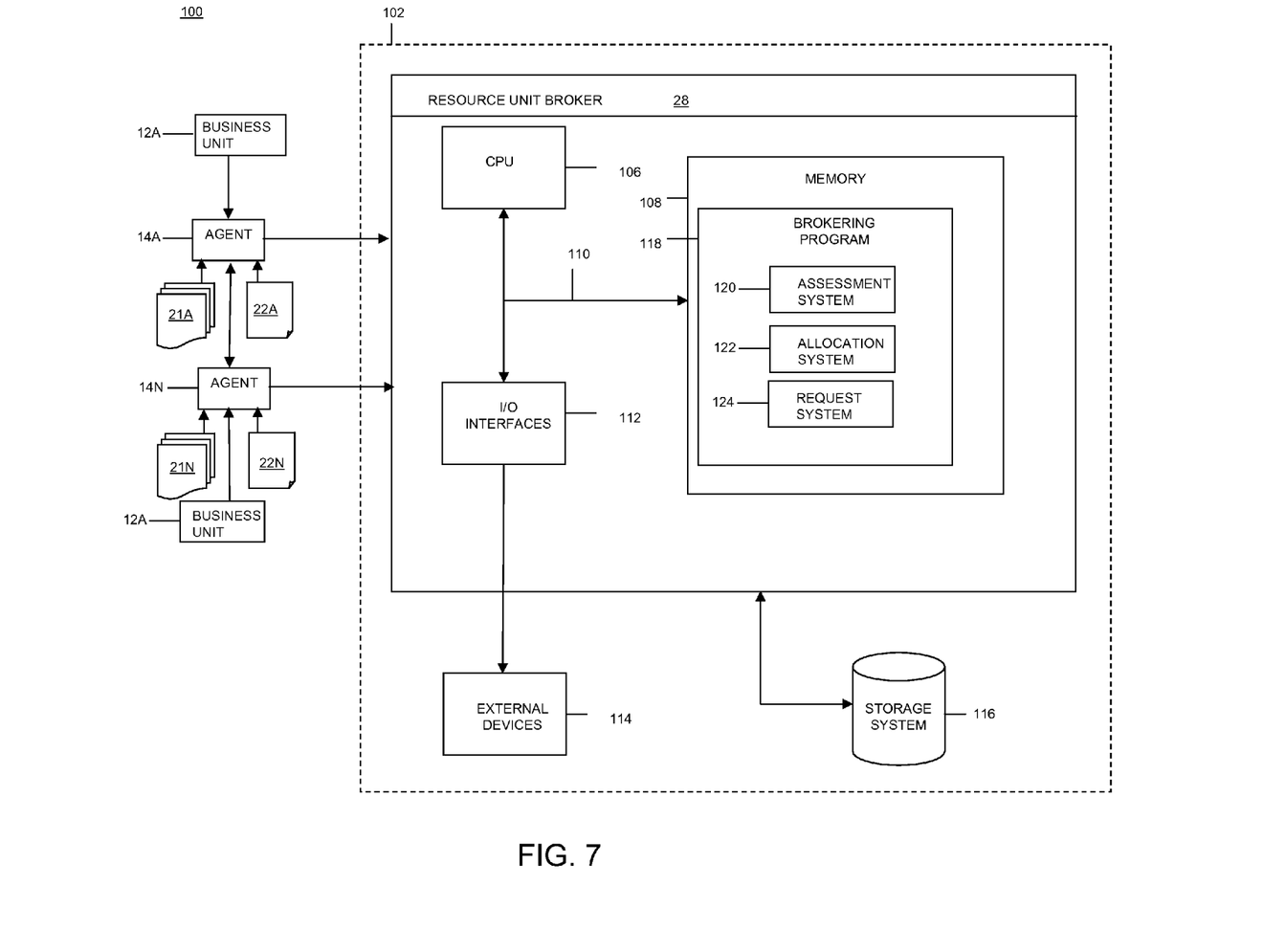
FIG. 7 shows a more detailed computerized implementation of the present invention.

Referring now to FIG. 7, a more detailed diagram of a computerized implementation 100 of the present invention is shown. As depicted, implementation 100 includes resource unit broker 28 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc. by a service provider who offers to implement, deploy, and/or perform the functions of the present invention for others.

As shown, resource unit broker 28 includes a processing unit 106, a memory 108, a bus 110, and input/output (I/O) interfaces 112. Further, resource unit broker 28 is shown in communication with external I/O devices/resources 114 and storage system 116. In general, processing unit 106 executes computer program code, such as brokering program 118, which is stored in memory 108 and/or storage system 116. While executing computer program code, processing unit 106 can read and/or write data to/from memory 108, storage system 116, and/or I/O interfaces 112. Bus 110 provides a communication link between each of the components in resource unit broker 28. External devices 114 can comprise any devices (e.g., keyboard, pointing device, display, etc.) that enable a user to interact with resource unit broker 28 and/or any devices (e.g., network card, modem, etc.) that enable resource unit broker 28 to communicate with one or more other computing devices.

Computer infrastructure 102 is only illustrative of various types of computer infrastructures for implementing the invention. For example, in one embodiment, computer infrastructure 102 comprises two or more computing devices (e.g., a server cluster) that communicate over a network to perform the various process of the invention. Moreover, resource unit broker 28 is only representative of various possible computer systems that can include numerous combinations of hardware. To this extent, in other embodiments, resource unit broker 28 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 106 may comprise a single processing unit, or be distributed across one or more processing units in one or more locations, e.g., on a client and server. Similarly, memory 108 and/or storage system 116 can comprise any combination of various types of data storage and/or transmission media that reside at one or more physical locations. Further, I/O interfaces 112 can comprise any system for exchanging information with one or more external device 114. Still further, it is understood that one or more additional components (e.g., system software, math co-processing unit, etc.) not shown in FIG. 7 can be included in resource unit broker 28. However, if resource unit broker 28 comprises a handheld device or the like, it is understood that one or more external devices 114 (e.g., a display) and/or storage system 116 could be contained within resource unit broker 28, not externally as shown.

Storage system 116 can be any type of system (e.g., a database) capable of providing storage for information under the present invention. To this extent, storage system 116 could include one or more storage devices, such as a magnetic disk drive or an optical disk drive. In another embodiment, storage system 116 includes data distributed across, for example, a local area network (LAN), wide area network (WAN) or a storage area network (SAN) (not shown). In addition, although not shown, additional components, such as cache memory, communication systems, system software, etc., may be incorporated into resource unit broker 28. It should be understood that resource unit capacity planner 16, resource allocation software 18, and change and configuration manager 20 have not been shown in FIG. 7 for clarity purposes.

Shown in memory 108 of resource unit broker 28 is brokering program 118, which facilitates the functions of resource unit broker 28 as described above. It should be understood that brokering program 118 can include any of the subsystems shown in the above-incorporated applications. Those shown in FIG. 7 have been depicted to illustrate the core functions of the non-depleting chip model of the present invention. As depicted, brokering program 118 includes assessment system 120, allocation system 122, and request system 124.

These systems facilitate the functions as described above. Specifically, assessment system 120 is configured to assess the IT needs of a party such as business units 12A-N, and allocation system 122 allocates a supply of non-depleting chips thereto for obtaining computational resources to address those IT needs. Typically, the supply is proportional/commensurate with the needs. In making the assessment, assessment system 120 can receive data/input and/or access historical data and IT needs for parties. In any event, request system 124 can then receive offers to purchase one or more computational resources using at least a portion of the allocated chips. At that point, the offer can be resolved using any strategy/method described in the above-incorporated patent applications.

While shown and described herein as a non-depleting chip model, it is understood that the invention further provides various alternative embodiments. For example, in one embodiment, the invention provides a computer-readable/useable medium that includes computer program code to enable a computer infrastructure to allocate resources using non-depleting chips. To this extent, the computer-readable/useable medium includes program code that implements each of the various process of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 108 (FIG. 7) and/or storage system 116 (FIG. 7) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process of the invention on a subscription, advertising, and/or fee basis. That is, a service provider, such as a Solution Integrator, could offer to allocate resources based on non-depleting chips. In this case, the service provider can create, maintain, support, etc., a computer infrastructure, such as computer infrastructure 102 (FIG. 7) that performs the process of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for allocating resources based on non-depleting chips. In this case, a computer infrastructure, such as computer infrastructure 102 (FIG. 7), can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as resource unit broker 28 (FIG. 7), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or I/O devices (including, but not limited to, keyboards, displays, pointing devices, etc.) can be coupled to the system either directly or through intervening I/O controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems and Ethernet cards.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method for allocating a supply of non-depleting chips for obtaining desired service level characteristics, comprising:
    assessing information technology (IT) needs of a party;
    allocating, using a computer device, a supply of non-depleting chips to the party for obtaining any of a plurality of computational resources to address the IT needs, a quantity of the supply being dependent upon a level of service that is desired by the party; and
    receiving, subsequent to the allocating of the supply of non-depleting chips, an offer to purchase a computational resource using at least a portion of the supply of non-depleting chips without reducing the quantity of the supply of non-depleting chips that have been allocated to the party.

2. The method of claim 1, further comprising:
    re-assessing the supply of non-depleting chips; and allocating a different supply of chips to the party based on the re-assessing.

3. The method of claim 1, the offer being received from an agent acting on behalf of the party.

4. The method of claim 3, the offer being received pursuant to a scheduled event for purchasing the computational resource.

5. The method of claim 3, the offer being received pursuant to an unscheduled event for purchasing the computational resource.

6. The method of claim 1, the computational resource being a processor.

7. The method of claim 1, the party being a business unit.

8. A system for allocating a supply of non-depleting chips for obtaining desired service level characteristics having at least one computer device that performs a method, comprising:
- assessing information technology (IT) needs of a party;
- allocating a supply of non-depleting chips to the party for obtaining any of a plurality of computational resources to address the IT needs, a quantity of the supply being dependent upon a level of service that is desired by the party; and
- receiving, subsequent to the allocating of the supply of non-depleting chips, an offer to purchase a computational resource using at least a portion of the supply of non-depleting chips without reducing the quantity of the supply of non-depleting chips that have been allocated to the party.

9. The system of claim 8,
- wherein the assessing further periodically re-assesses the supply of non-depleting chips; and
- wherein the allocating further allocates a different supply of chips to the party based on the re-assessing.

10. The system of claim 8, the offer being received from an agent acting on behalf of the party.

11. The system of claim 10, the offer being received pursuant to a scheduled event for purchasing the computational resource.

12. The system of claim 10, the offer being received pursuant to an unscheduled event for purchasing the computational resource.

13. The system of claim 8, the computational resource being a processor.

14. The system of claim 8, the party being a business unit.

15. A program product stored on a computer readable storage medium for allocating a supply of non-depleting chips for obtaining desired service level characteristics, the computer readable medium comprising program code for causing a computer system to:
- assess information technology (IT) needs of a party;
- allocate a supply of non-depleting chips to the party for obtaining any of a plurality of computational resources to address the IT needs, a quantity of the supply being dependent upon a level of service that is desired by the party; and
- receive, subsequent to the allocating of the supply of non-depleting chips, an offer to purchase a computational resource using at least a portion of the supply of non-depleting chips without reducing the quantity of the supply of non-depleting chips that have been allocated to the party.

16. The program product of claim 15, the computer readable medium further comprising program code for causing the computer system to:
- re-assess the supply of non-depleting chips; and
- allocate a different supply of chips to the party based on the re-assessing.

17. The program product of claim 15, the offer being received from an agent acting on behalf of the party.

18. The program product of claim 17, the offer being received pursuant to a scheduled event for purchasing the computational resource.

19. The program product of claim 17, the offer being received pursuant to an unscheduled event for purchasing the computational resource.

20. The program product of claim 15, the computational resource being a processor.

21. The program product of claim 15, the party being a business unit.

22. A method for deploying a system for allocating a supply of non-depleting chips for obtaining desired service level characteristics, comprising:
- providing a computer infrastructure having a computer device that operates to:
  - assess information technology (IT) needs of a party;
  - allocate a supply of non-depleting chips to the party for obtaining any of a plurality of computational resources to address the IT needs, a quantity of the supply being dependent upon a level of service that is desired by the party; and
  - receive, subsequent to the allocating of the supply of non-depleting chips, an offer to purchase a computational resource using at least a portion of the supply of non-depleting chips without reducing the quantity of the supply of non-depleting chips that have been allocated to the party.

23. The method of claim 22, the computer infrastructure being further operable to:
- re-assess the supply of non-depleting chips; and
- allocate a different supply of chips to the party based on the re-assessing.

* * * * *